United States Patent
Benn

(10) Patent No.: US 6,721,563 B1
(45) Date of Patent: Apr. 13, 2004

(54) SIGNAL MEASUREMENT

(75) Inventor: Howard Benn, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/515,734

(22) Filed: Feb. 29, 2000

(30) Foreign Application Priority Data

Nov. 24, 1999 (GB) ................................................ 9927800

(51) Int. Cl.[7] ................................................ H04Q 7/20
(52) U.S. Cl. ........................ 455/436; 455/438; 370/314; 370/331
(58) Field of Search ................................ 455/436, 437, 455/438, 443, 444, 446, 450, 452.2, 434; 370/310, 314, 321, 331, 332

(56) References Cited

U.S. PATENT DOCUMENTS

| | | | | |
|---|---|---|---|---|
| 4,723,266 A | * | 2/1988 | Perry | 455/446 |
| 5,548,806 A | * | 8/1996 | Yamaguchi et al. | 455/441 |
| 5,722,072 A | * | 2/1998 | Crichton et al. | 455/437 |
| 5,809,017 A | * | 9/1998 | Smith et al. | 370/318 |
| 5,940,743 A | * | 8/1999 | Sunay et al. | 455/69 |
| 5,946,612 A | * | 8/1999 | Johansson | 455/405 |
| 5,995,807 A | * | 11/1999 | Magnier et al. | 455/226.3 |
| 6,078,959 A | * | 6/2000 | Wright et al. | 370/230 |
| 6,192,245 B1 | * | 2/2001 | Jones et al. | 455/437 |
| 6,289,007 B1 | * | 9/2001 | Kim et al. | 370/331 |
| 6,345,075 B1 | * | 2/2002 | Fuhl et al. | 342/359 |
| 6,498,785 B1 | * | 12/2002 | Derryberry et al. | 370/311 |
| 2002/0049061 A1 | * | 4/2002 | Pinola | 455/452 |

FOREIGN PATENT DOCUMENTS

| | | | | |
|---|---|---|---|---|
| JP | 01054157 A | * | 3/1989 | F24F/11/02 |
| JP | 10248090 A | * | 9/1998 | H04Q/7/38 |
| WO | WO 97/21320 | | 6/1997 | |
| WO | WO 99/65264 | | 12/1999 | |

* cited by examiner

Primary Examiner—Cong Van Tran

(57) ABSTRACT

A method of assessing a signal in a second capsule (114) within a cell (102) of RF capsules in a cellular communications system, wherein measurements indicative of the signal are made by a first capsule (112) whilst it is servicing a call. The present invention enables the smooth handover of calls between capsules, where mobile assisted handover is unavailable, whilst reducing the system complexity and cost overheads prevalent in current systems.

7 Claims, 2 Drawing Sheets

| TS0 | TS1 | TS2 | TS3 | TS4 | TS5 | TS6 | TS7 |

SIGNAL MEASUREMENT

FIELD OF THE INVENTION

Generally, this invention concerns radio communications system and more particularly cellular radio communications systems which use radio frequency (RF) capsules within a standard cell.

BACKGROUND OF THE INVENTION

Traditional cellular systems break down a geographic area into groupings of cells. Each cell provides communication services to mobile stations contained within that cell. In order to provide these services, a base station provides a broadcast control channel upon a predetermined frequency from which all mobile stations contained within the cell can listen. In response, a mobile station can transmit a random access channel burst back to the serving base site whereupon the base site allocates a traffic channel for which the mobile station may communicate to the base site for providing communication services such as voice and or data services.

There is an inherent limitation on the number of mobile stations to which a base site may provide communication services. This limitation is determined by the cell size, the frequency reuse pattern of the cell and its surrounding cells and the number of frequencies or traffic channels allocated to the cellular system. In order to increase the capacity provided by a cellular system the physical size of the cells may be reduced, thus providing more cells within a particular system.

As cellular systems become more prevalent in our society and the usage of the systems increases, there is a need to provide more capacity within the cellular systems.

When implementing cellular systems within large buildings there are many sources of interference and also a large concentration of people that could use the system.

Traditional systems provide many extremely small cells to provide service to all the users within the building. By providing this plurality of very small cells, there is often a need to hand over more frequently between the cells creating a large amount of overhead communications between cells. Examples of such handover procedures may be found in the Global System for Mobile communications (GSM) recommendations.

In a conventional GSM system, when a mobile station (MS) or handset starts to move from the area of coverage of one cell to that of another, the MS makes measurements of the surrounding broadcast control channels (BCCH's) contained in the broadcast allocation (BA) list. The instruction to measure the surrounding BCCH's is received from the base station subsystem (BSS), which also receives the measurements made by the MS and uses these measurements to decide whether or not to switch between cells and also which cell is the most appropriate to switch to. This is known as mobile assisted handover.

Additionally, these systems are extremely sensitive to interference caused by adjacent cells, consequently they are fixed geographically and must be re-planned for each change in the dynamics of the system.

When considering a traditional cellular communications system, were the physical size of the cells contained therein to shrink to a few meters in diameter, the complexity of handing over calls between a first cell and a second cell would arise more often, and thus the complexity of the handover procedure would increase thereby requiring a more cumbersome system architecture.

In order to reduce the handover overheads and to improve the reuse factor of a conventional GSM cellular communications system, capsule based systems have been used. A capsule based system comprises a number of radio frequency capsules within the geographic area of a cell which services a high number of MS's in a small area. The capsules use only the BCCH of that cell, there are not individual BCCH's for each capsule. The BCCH is simucast for all capsules within the cell, i.e. the same information is being transmitted for each capsule. As such, the capsule controller has no information about the capsules available to assist in the handover process.

Additionally, cell overlap creates interference problems which are immeasurable by the conventional system and therefore discouraged. Thus, in order to design properly such a small system, the placement of the cells must be carefully planned because any changes such as office reconfiguration, tearing down walls or just moving furniture within the offices can create enough overlap for which a cellular re-plan is required, thereby creating a large amount of headache for system implementers.

The problems outlined above were addressed in U.S. Pat. No. 6,064,661, which patent is assigned to the assignee of the present invention. Here it was suggested that a separate measurement receiver be built in to each RF capsule. The controller is then able to request for a measurement of signal strength to be made on a given time slot and radio frequency. This enables the controller to make decisions about whether a call should be handed from one capsule to another. However, the addition of a further receiver and the associated processing add a large overhead to the complexity and cost of such a system. As such, there is a requirement that the above highlighted deficiencies be addressed in such a way as to reduce the complexity and cost of such communications systems.

SUMMARY OF THE INVENTION

The present invention aims to address all or some of the above disadvantages.

In accordance with a preferred embodiment of the present invention there is provided a method of assessing a signal in a second capsule within a cell of the cellular communications system, wherein a measurement indicative of the signal is made by a first capsule whilst it is servicing a call.

This method has the advantage of allowing a capsule controller in a picocellular or microcellular (or other) communications system to establish the strength of a signal of an adjacent capsule whilst enabling a decision to be made about the most suitable capsule to carry a call from a mobile station. This assessment procedure allows smooth handovers between capsules in such systems where there is no provision for mobile assisted handover, because all the relevant capsules reside within a single cell with a corresponding single BCCH.

The present invention also provides a cellular communications system comprising at least one cell, at least one capsule designated therein, and a capsule controller, wherein a measurement indicative of a signal in a second capsule is made by a first capsule whilst it is servicing a call. This system reflects the same advantages of the above method and further allows the use of the same frequencies in a cell at the same time. This is facilitated by the use of different capsules, thus providing for a greater number of MS's to be supported by the cell.

Additional specific advantages of the present invention are apparent from the following description and figures.

DETAILED DESCRIPTION OF THE PREFERRED EMBODIMENT

A preferred embodiment of this invention operates in a radio communications system that utilises multiple cells to provide radio communications services to a plurality of mobile stations. In the cells that service high concentrations of mobile stations within a very small geographical area, such as large office buildings, there are provided a plurality of radio frequency capsules in the geographic area served by the cell. These are known as picocellular and microcellular systems. Picocellular systems are generally intrabuilding systems, whilst microcellular systems may be in-building or outside systems. Additionally, they may comprise a part of a larger system, or be stand alone.

In addition to having a base site for providing a broadcast control channel (BCCH), each cell contains multiple RF capsules for transmitting and receiving traffic channels as well as receiving Random Access Channel bursts from a plurality of mobile stations in a portion of the geographical area serviced by the base site. The. RF capsules do not provide a BCCH, rather the BCCH is provided by the base station that is servicing the particular cell.

Figures 1, 2:
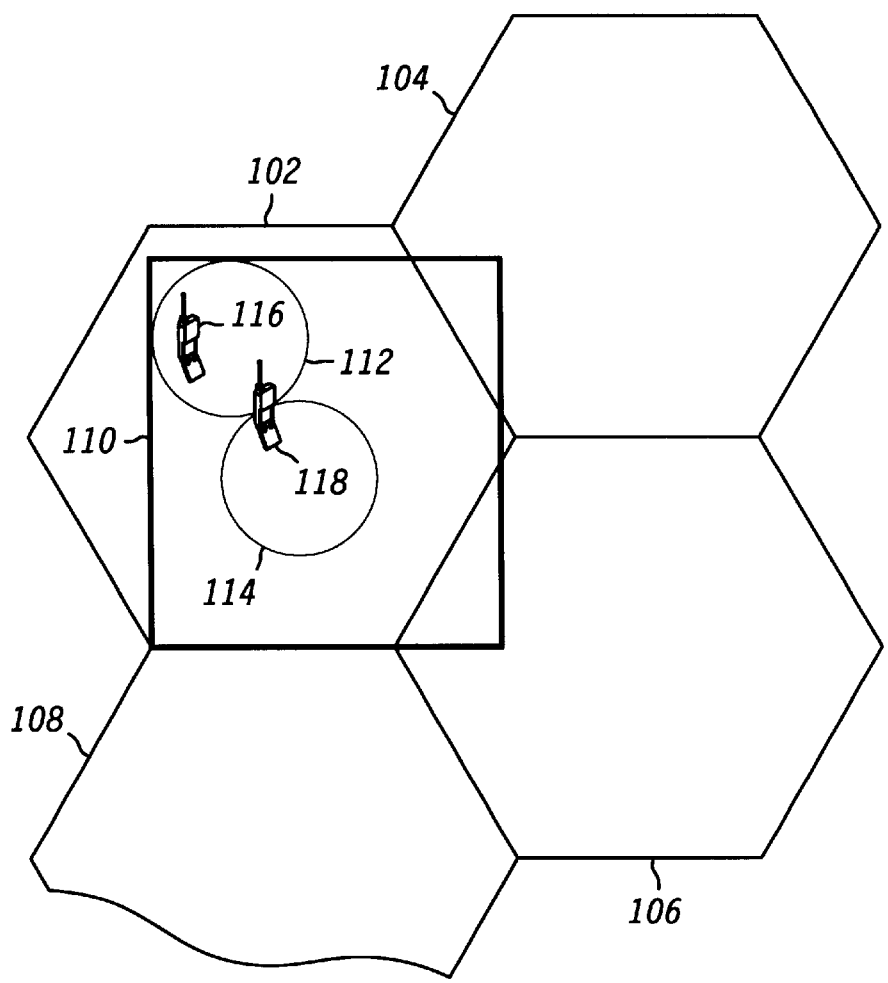
FIG. 1 is an illustration of a portion of a mobile communications network operating in accordance with the present invention.
FIG. 2 is an illustration of the sub-division of a capsule frequency.

Such a system may be seen in FIG. 1, in which are depicted four cells 102,104,106,108 of a cellular communications system. A building 110 is also shown and is almost entirely within the geographical area of the first cell 102. Within the first cell 102 there are shown two radio frequency capsules 112,114, and within these capsules there are, for the purpose of example, two mobile stations 116,118.

When the mobile stations are operative within a capsule, they will each be allocated a time slot and a frequency. The frequency will be that of the capsule, and that frequency will be subdivided into (normally) eight different time slots, as illustrated in FIG. 2. The mobile stations 116,118 in the neighbouring capsules 112,114 may be operative upon the same time slot within their designated frequency, or upon different time slots. The same frequencies may also be reused within the cell, though not in adjacent capsules.

The cellular communications system operates as is conventional in the art in that data to be transmitted is encoded, modulated and interleaved at the transmitter and un-interleaved, demodulated and decoded at the receiver. Additionally, the system measures the quality of a call in progress based upon the quality factors supplied by the channel decoder, i.e. the decoder used to encode/decode the data transmitted upon the communication channel upon which the call is being made. The channel is defined by at least a first frequency and a first time slot. The quality is measured in the standard way, assessing the bit error rate (BER) of the MS and establishing whether it is acceptable based upon standard criteria. This quality is known as Receiver Quality (RxQual).

Figure 3:
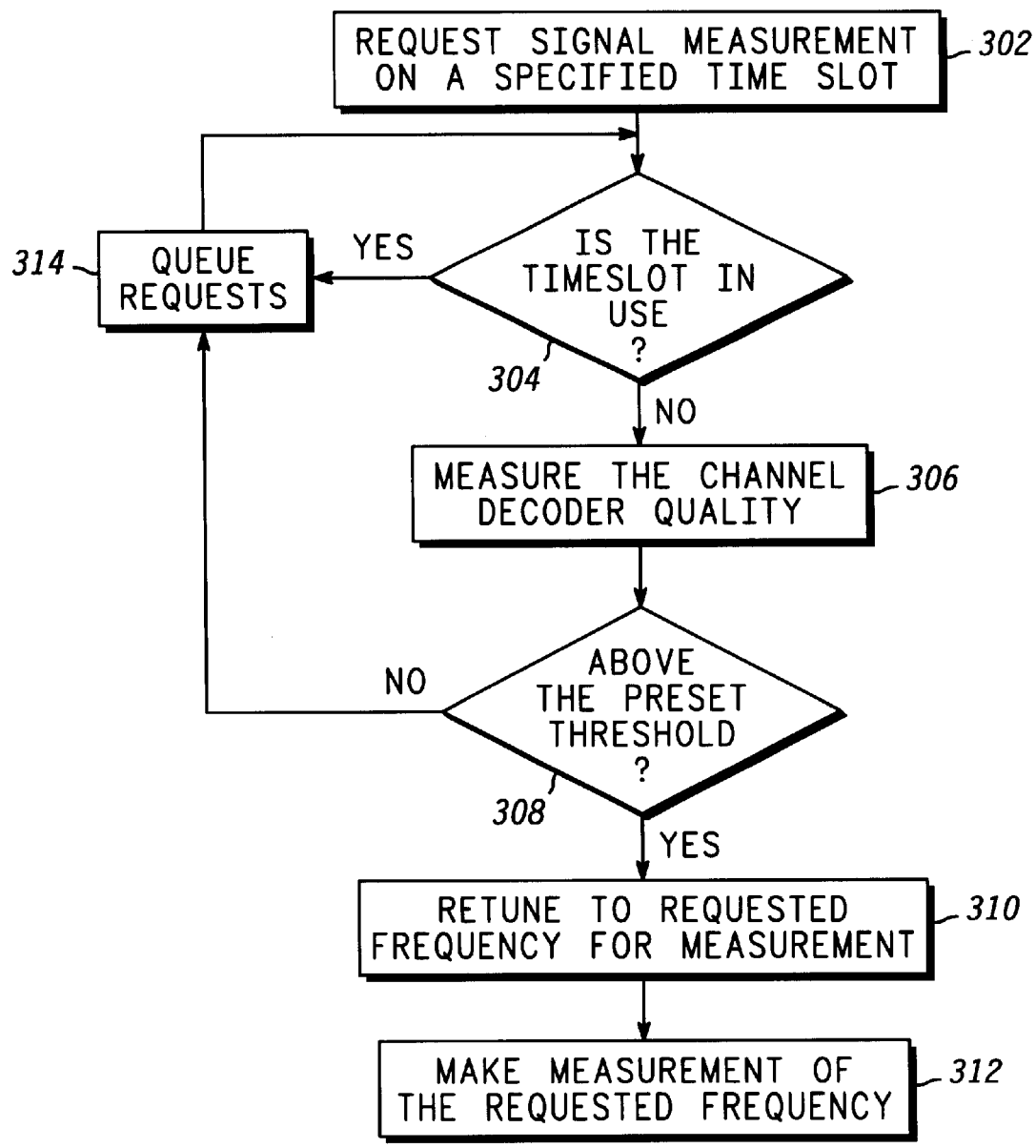
FIG. 3 is a flow diagram of the method of the present invention.

The assessment of the quality of a call will determine whether a call needs to be transferred or handed over from the capsule by which it is currently being serviced to a further capsule. Such a change may be necessitated by better coverage being available from another capsule, or by the MS making the call moving from the area covered by one capsule to that of another. If the call quality is not acceptable, the following procedure is followed, as detailed in FIG. 3.

In order to make a decision regarding the handover of a call from one capsule within a cell to another capsule within that cell, the capsule controller will send a request for signal measurements to be made on a specific time slot and frequency (corresponding to another adjacent capsule) to the capsule servicing the calls (function box 302). In order to carry this out in a conventional system, a dedicated receiver would be required in each capsule. The present invention avoids the need for such dedicated receivers.

Upon receipt of this request, the time slot for which the request is received is assessed (function box 304). If the time slot is currently being used, the request is queued (box 314). If not, the procedure continues.

As illustrated by function box 306, upon receipt of a request the channel decoder quality is measured. This is the quality of the data passing through the channel decoder and is the measure of what proportion of the data will be lost by the process of encoding/decoding. If this quality is above a pre-set threshold (function box 308), then step 310 is carried out. The threshold determining which stage of the process is taken next is an arbitrary threshold set, based upon system specific criteria, to ensure that a sufficient quality of call will be maintained during the following steps of the procedure.

In step 310, the capsule in question is retuned to the requested frequency. As a result of this retuning, the next speech time slot of the call being serviced by the capsule that is just being retuned will be lost. However, the capsule is only retuned for the duration of one time slot and the effect of losing speech data from a single time slot, $\frac{1}{8}$ of a speech frame, will be very little. Very little degradation in call quality, if any, will be experienced because of the data rate of the channel decoder and the interleaving of the data. These two features constitute parts of the "multiple fins" of error correction, commonly employed within such systems.

The following step (function box 312) is the measurement of the requested frequency. The measurements are made and sent to the capsule controller to enable it to assess whether a change of capsule is required. The capsule is then retuned to its original frequency in order to service the next time slot.

Referring again to step 304, should the time slot for which measurements are required be in use, the system will queue the request (function box 314) until such time as the time slot is not being used; then the next occurrence of that time slot will be used as detailed above.

Similarly, should the channel decoder quality measured in step 306 not exceed the threshold at step 308, the request will be queued (function box 314) to prevent an unacceptable drop in call quality, until such time as the requested time slot is not in use and the channel decoder quality is above the threshold set.

To further clarify the invention, the method will be described applied to the system of FIG. 1. The first mobile station 116 is in call to the first capsule 112 on time slot A, frequency X. The second mobile station 118 is in call to the second capsule 114 on time slot A, frequency Y. When the capsule controller requests a signal measurement to be made by the first capsule 112 on time slot A, frequency Y, the first capsule 112 looks at the quality of the call with the first MS 116 which it is servicing. If the quality is high, i.e. in excess of the threshold of acceptability, then on the next time slot allocated for speech data, the receiver for the first MS 116 is retuned from frequency X to frequency Y and a measurement of that frequency is made. At the end of the time slot, once the measurements have been made, the first capsule 116 is returned to its original frequency X.

In order to compensate for the data missing from the call from the first MS 116 being serviced by the first capsule 112 during the period when the receiver is tuned to the frequency Y of the second capsule 118, either random data or data in a predetermined pattern is sent to the deinterleaver in the channel decoder to mimic the data lost. In order to maintain an acceptable call quality this should only be carried out once per speech frame (i.e. once per eight time slots).

This invention as been described as applying particularly to picocellular systems, i.e. intrabuilding systems. However, it will be appreciated that it can also be applied to microcellular systems and any other system utilising RF capsules within a cell geographical area.

It will of course be understood that this invention has been described by way of example only, and that modifications of detail can be made within the scope of the invention.

I claim:

1. A method of assessing a signal of a second capsule within a cell of a cellular communications system, the cell comprising a first and second capsule not transmitting individual broadcast channels but sharing a common broadcast channel provided by a base station serving said cell and connected to a capsule controller, the method comprising:

using the first capsule to make a measurement indicative of the signal whilst the first capsule is servicing a call;

retuning a receiver to a requested frequency;

making a measurement;

retuning the receiver to its original frequency;

receiving a request for signal measurement;

establishing whether a specified time slot is in use; and wherein if the time slot is in use, the request is queued.

2. A method according to claim 1, wherein the step of making the measurement comprises measuring a channel decoder quality.

3. A method according to claim 2, wherein if the channel decoder quality is below a pre-set threshold, the request is queued.

4. A method according to claim 1, wherein requests remain queued until such time as a necessary requirements for their processing are met.

5. A method according to claim 3, wherein requests remain queued until such time as the necessary requirements for their processing are met.

6. A cellular communications system, comprising:

at least one cell;

at least a first and second capsule designated within the at least one cell, the first and second capsule not transmitting individual broadcast channels but sharing a common broadcast channel provided by a base station serving said at least one cell;

a capsule controller connected to said first and second capsule, the first capsule comprising:

means for retuning a receiver to a requested frequency;

means for making a measurement;

means for retuning the receiver to its original frequency;

means for receiving a request for signal measurements;

means for establishing whether a specified time slot is in use;

means for queuing the request if the time slot is in use; and wherein a measurement indicative of a signal of the second capsule is made by the first capsule whilst the first capsule is servicing a call.

7. A cellular communications system according to claim 6, wherein a first mobile station is transmitting on a first radio frequency during a first time slot and a second mobile station is transmitting on the same radio frequency at the same time within the same cell geographical area.

\* \* \* \* \*